(12) United States Patent
Vallapuzha et al.

(10) Patent No.: US 8,170,715 B1
(45) Date of Patent: May 1, 2012

(54) METHODS AND DEVICES FOR AUTOMATED WORK IN PIPES BASED ON IMPEDANCE CONTROL

(75) Inventors: Subramanian Vallapuzha, Pittsburgh, PA (US); Scott M. Thayer, Pittsburgh, PA (US); Eric C. Close, Sewickley, PA (US); Joseph Salotti, Pittsburgh, PA (US); Ronald Genise, Wexford, PA (US); Alan Gerber, Pittsburgh, PA (US); Adam Slifko, Pittsburgh, PA (US); Edison Hudson, Chapel Hill, NC (US); Gregory Baltus, Pittsburgh, PA (US); Carlos F. Reverte, Miami, FL (US); Prasanna Kumar Velagapudi, Suffern, NY (US)

(73) Assignee: RedZone Robotics, Inc., Pittsburgh, PA (US)

( * ) Notice: Subject to any disclaimer, the term of this patent is extended or adjusted under 35 U.S.C. 154(b) by 0 days.

(21) Appl. No.: 11/340,166

(22) Filed: Jan. 25, 2006

Related U.S. Application Data (60) Provisional application No. 60/647,142, filed on Jan. 25, 2005.

(51) Int. Cl.
*G06F 19/00* (2006.01)
*G05B 19/18* (2006.01)
*G05B 15/00* (2006.01)
*E02F 5/10* (2006.01)
*F16L 55/18* (2006.01)

(52) U.S. Cl. ........ 700/245; 700/253; 700/259; 700/260; 405/184.1; 138/97

(58) Field of Classification Search .................. 700/245, 700/253, 258, 260, 259; 405/184.1; 138/97
See application file for complete search history.

(56) References Cited

U.S. PATENT DOCUMENTS

| 3,562,642 | A | 2/1971 | Hochschild |
| 3,672,785 | A | 6/1972 | Byrne |
| 4,029,428 | A | 6/1977 | Levens |

(Continued)

FOREIGN PATENT DOCUMENTS

AT 397432 8/1993

(Continued)

OTHER PUBLICATIONS

Lawson S.W & Pretlove, Augmented reality for underground pipe inspection and maintenance, Mechatronic Systems and Robotics Research Group, 1998.*

(Continued)

*Primary Examiner* — Albert DeCady
*Assistant Examiner* — Darrin Dunn
(74) *Attorney, Agent, or Firm* — Reed Smith LLP

(57) ABSTRACT

Methods and tools for automatically performing work within a pipe or pipe network based on sensed impedance information. A robot, which may be tethered or un-tethered, includes a computer controller and a work tool for performing work within the pipe. With or without impedance-based calibration, the robot senses environmental and tool-based impedance characteristics and determines, using said software, ways in which the current work performance can be altered or improved based on the impedance information. The operation of the work tool is then altered in line with the control software. Many different types of work related to the inspection, cleaning and rehabilitation of pipes can be accomplished with the present robots including reinstating laterals after lining, cutting or clearing debris, sealing pipe joints and/or other heretofore manual pipe-based processes.

14 Claims, 9 Drawing Sheets

U.S. PATENT DOCUMENTS

| | | | |
|---|---|---|---|
| 4,197,908 A | | 4/1980 | Davis et al. |
| 4,431,017 A | | 2/1984 | Willemsen |
| 4,437,526 A | | 3/1984 | Gloor |
| 4,442,891 A | | 4/1984 | Wood |
| 4,521,685 A | * | 6/1985 | Rebman ................. 250/229 |
| 4,577,388 A | * | 3/1986 | Wood ..................... 29/558 |
| 4,613,812 A | | 9/1986 | Gelston, II |
| 4,630,676 A | | 12/1986 | Long, Jr. |
| 4,648,454 A | | 3/1987 | Yarnell |
| 4,701,988 A | | 10/1987 | Wood |
| 4,765,173 A | | 8/1988 | Schellstede |
| 4,819,721 A | | 4/1989 | Long, Jr. |
| 4,822,211 A | | 4/1989 | Shinoda et al. |
| 4,862,808 A | | 9/1989 | Hedgcoxe et al. |
| 4,951,758 A | | 8/1990 | Sonku et al. |
| 4,955,951 A | | 9/1990 | Nemoto et al. |
| 5,044,824 A | | 9/1991 | Long, Jr. et al. |
| 5,088,553 A | | 2/1992 | Ralston et al. |
| 5,105,882 A | | 4/1992 | Ralston et al. |
| 5,150,989 A | | 9/1992 | Long, Jr. et al. |
| 5,195,392 A | | 3/1993 | Moore et al. |
| 5,272,986 A | | 12/1993 | Smart |
| 5,329,824 A | | 7/1994 | Carapezza et al. |
| 5,387,092 A | * | 2/1995 | Pettitt et al. ................. 417/269 |
| 5,454,276 A | | 10/1995 | Wernicke |
| 5,565,633 A | | 10/1996 | Wernicke |
| 5,571,977 A | | 11/1996 | Kipp |
| 5,574,223 A | | 11/1996 | Kiefer |
| 5,577,864 A | * | 11/1996 | Wood et al. ................. 405/184.2 |
| 5,608,847 A | | 3/1997 | Pryor |
| 5,736,821 A | | 4/1998 | Suyama |
| 5,742,517 A | | 4/1998 | Van Den Bosch |
| 5,773,984 A | | 6/1998 | Suyama et al. |
| 5,878,783 A | | 3/1999 | Smart |
| 5,947,051 A | | 9/1999 | Geiger |
| 5,947,213 A | | 9/1999 | Angle et al. |
| 6,031,371 A | | 2/2000 | Smart |
| 6,056,017 A | * | 5/2000 | Kamiyama et al. .............. 138/98 |
| 6,162,171 A | | 12/2000 | Ng et al. |
| 6,175,380 B1 | | 1/2001 | Van Den Bosch |
| 6,377,734 B1 | | 4/2002 | Mayr et al. |
| 6,386,797 B1 | * | 5/2002 | Gearhart .................. 405/184.3 |
| 6,427,602 B1 | | 8/2002 | Hovis et al. |
| 6,450,104 B1 | | 9/2002 | Grant et al. |
| 6,697,710 B2 | | 2/2004 | Wilcox |
| 6,745,955 B2 | | 6/2004 | Kronz |
| 6,964,309 B2 | | 11/2005 | Quinn et al. |
| 7,009,698 B2 | | 3/2006 | Drost et al. |
| 7,042,184 B2 | | 5/2006 | Oleynikov et al. |
| 7,073,979 B2 | | 7/2006 | McGrew et al. |
| 7,126,303 B2 | | 10/2006 | Farritor et al. |
| 7,131,791 B2 | | 11/2006 | Whittaker et al. |
| 7,137,465 B1 | | 11/2006 | Kerrebrock et al. |
| 7,191,191 B2 | * | 3/2007 | Peurach et al. ................. 1/1 |
| 7,210,364 B2 | | 5/2007 | Ghorbel et |
| 2002/0062177 A1 | * | 5/2002 | Hannaford et al. ........... 700/245 |
| 2003/0089267 A1 | | 5/2003 | Ghorbel et al. |
| 2003/0172871 A1 | | 9/2003 | Scherer |
| 2003/0198374 A1 | | 10/2003 | Hagene et al. |
| 2003/0216836 A1 | | 11/2003 | Treat et al. |
| 2004/0088080 A1 | | 5/2004 | Song et al. |
| 2004/0175235 A1 | * | 9/2004 | Whittaker et al. .............. 405/51 |
| 2005/0288819 A1 | * | 12/2005 | de Guzman .................. 700/245 |
| 2006/0074525 A1 | * | 4/2006 | Close et al. .................. 700/245 |
| 2007/0153918 A1 | | 7/2007 | Rodriguez |

FOREIGN PATENT DOCUMENTS

GB  2091611 A  *  8/1982

OTHER PUBLICATIONS

Roth H & Schilling K., Inspection and Repair Robots for Waste Water Pipes—A Challenge to Sensorics and Locomotion, IEEE, 1998.*
Schenker P., Advanced Man-Machine Interface and Contro, Architecture for Dexterous Teleoperations, IEEE, 1991.*
Jinno et al., Force Controlled Grinding Robot System for Unstructered Tasks, IEEE Jul. 1992.*
Vukobratovic, Contact Control Concepts in Manipulation Robots—An Overview, IEEE, Feb. 1994.*
Zeng et al., An Adaptive Control Strategy for Robotic Cutting, IEEE 1997.*
Gu et al., Interpretation of Mechanical Impedance Profiles for Intelligent Control of Robotic Meat Processing, IEEE, 1996.*
Jung et al., Adaptive Force Tracking Impedance Control of Robot for Cutting Nonhomogeneous Workpiece, IEEE, 1999.*
Wang et al., Application of Force Control on the working Path Tracking, Journal of Marine Science and Technology, 2002.*
Xiao et al., Sensor-Based Hybrid Position/Force Control of a Robot Manipulator in an Uncalibrated Environment, IEEE, 2000.*
Silva (Intelligent control of robotic systems with application in industrial processes, 1997).*
Nitzan (Three-Dimensional Vision Structure for Robot Applications, IEEE, 1988).*
Yamada et al. (A method of 3D Object Reconstruction by Fusing Vision with Touch Sensing Using Internal Models with Globla and Local Deformations, IEEE, 1993).*
Remote Orbital Installations LLC, website, roi360.com/equipment. html; date unknown.
Remote Orbital Installations LLC, Transpod Product Brochure; date unknown.
Cues Inc., CUES-IMX Product Brochure; date unknown.
Cues Inc., Quick ZoomCam Product Brochure; date unknown.
"EPA Collection Systems O&M Fact Sheet Sewer Cleaning and Inspection", United States Environmental Protection Agency, Office of Water, EPA 832-F-99-031, Sep. 1999.
Hirose, et al., "Design of In-Pipe Inspection Vehicles phi50, phi150 pipes", IEEE, pp. 2309-2314, 1999.
Kawaguchi et al., "An Efficient Algorithm of Path Planning for an Internal Gas Pipe Inspection Robot", IEEE, pp. 1155-1160, 1992.
Bertetto, et al., "Robot Flessibile a Basso Costo Per Ispezioni Tuni", Internet, pp. 1477-1483, 2001.
Torboin, "Advanced Inspection Robot for Unpiggable Pipelines", Internet, pp. 1-9, 2006.

* cited by examiner

FIGURE 9 ns and Devices for Automated Work in Pipes Based on Impedance Control

CROSS-REFERENCE TO RELATED APPLICATION

This application claims the benefit under 35 U.S.C. §119(e) of the earlier filing date of U.S. Provisional Application Ser. No. 60/647,142 filed on Jan. 25, 2005.

BACKGROUND OF THE INVENTION

1. Field of the Invention

The present invention relates generally to devices and methods for using impedance or resistance control to perform work within a pipe network, and, more specifically, the present invention is directed to robots capable of determining a local amount of impedance related to the performance of a predefined task and performing said task based upon the determined impedance.

2. Description of the Background

The oldest pipes in the United States date to the late 1800's, and the average non-rehabilitated water and sewer pipe is more than 50 years old. However, depending on the type of material used, pipe operating life ranges from only 50 to 125 years. Much of the existing pipe, therefore, needs to either be replaced or rehabilitated (relined or otherwise repaired) in short order.

A major problem in the U.S. sewer system is inflow and infiltration ("I&I"). I&I is caused by the inflow of rainwater into the sewer system due to heavy rains and/or the fact that many sewer lines lie below the water table. I&I increases costs at sewage treatment plants, and, in a number of cases, the additional water injected during a rainstorm outstrips the capacity of treatment plants. This often results in the diversion of raw sewage into rivers and streams.

Along the same lines, the biggest problem in the U.S. potable water system is leaky pipes. For example, estimates hold that 35% to 50% of drinking water in the U.S. is unaccounted for once it leaves a water treatment facility, the vast majority of which is lost through leaky pipes. The urgent need to rehabilitate water pipes exists to reduce water leakage from the system, reduce costly emergency break repairs and increase water quality at the consumer's tap.

Government regulation is also increasing in these areas. In June 1999, the GASB (Government Accounting Standards Board) issued "Statement 34" requiring state and local governments to report the value of their infrastructure assets such as buried pipes, storm sewers, bridges and roads. Additionally, the EPA is actively pursuing consent decrees—forcing cities to eliminate sewage overflow into rivers and other bodies of water during heavy rainfalls and to increase water quality nationwide. Finally, the Safe Drinking Water Act, first passed in 1974, requires municipal water suppliers to guarantee that the water quality at the tap is the same as the water quality at the purification plant. The decay, sediment and leakage taking place in either water pipes or water storage tanks accounts for impurities in drinking water that enter the system after the water leaves the water purification plant, and prevents the satisfaction of these government regulations.

In general, the three main functions required to maintain our piping infrastructure are: (1) cleaning; (2) inspecting; and (3) rehabilitating. Cleaning involves the removal of obstructions and debris that blocks the flow of water and sewage. Inspecting involves mapping the pipe interior, characterizing the pipe's defects, and developing a maintenance plan for the pipe. Rehabilitating the pipe involves maintaining and fixing faulty piping.

Many maintenance tasks are accomplished by deploying robots into pipes as part of methods to clean, inspect, or rehabilitate pipes, but these methods rely on manual operation to detect pipe locations, pipe edges, sediment and thickness of sediment, thickness of obstructions, cutting force necessary to cut through obstructions, or other aspects important for pipe maintenance. The present invention's impedance control methods, which automatically detect these various aspects by monitoring impedances encountered by robots, reduce the need for manual operator interaction and improve the speed, quality, and consistency of pipe maintenance tasks.

For example, contractors currently use dedicated trucks equipped with remote controlled cutters and video inspection equipment to perform cutting operations related to rehabilitation, including protruding tap cutting and lateral reinstatement among others. In these traditional methods, the operator directs the view of the camera and the forward motion of the remote cutter until the area of interest (typically the hole to be cut) is within the operator's sight (through the camera display). The operator then uses the view from the camera and a set of manually adjusted controls to direct the cutting bit in three axes of motion. By manually controlling the speed, depth, and direction (cutting path), he performs the cutting process.

During the process of cutting, the operator continuously views the image, stopping to adjust the controls to compensate for errors in the cutting bit speed and position. This approach is limited in speed, quality, and consistency because it relies on the skill and experience of the operator to perform the task.

One important limitation of efforts to use automatic robotic methods to, for example, cut open laterals after relining, stems from the fact that the lateral/main interface is not in a regular or predictable shape. Because laterals intersect with mains at a variety of different angles (and different size laterals), there is no way to "predefine" a cutting pattern to open the laterals after lining. The present invention, however, does not rely upon prior knowledge of the intersection, and is adaptable to all intersections.

Moreover, prior cutting methods rely upon recognition of the "dimple" or protrusion commonly caused in the new lining at the opening to a lateral in order to begin a lateral cutting operation (because cutting by sight is utilized). Since the only requirement for the impedance method of the present invention is to get the tool to plunge inside the lateral opening, in pipes where there are no dimples (or in pipes that are filled with an opaque fluid which does not allow visual perception, the present methods can still be employed with accurate odometry and clocking information on the location of the lateral openings from a pre-lining inspection.

In much the same way, prior methods relied upon a high degree of accuracy in determining the pre-cutting pose of the robot (and matching the robot's actual pose to a pre-programmed intended pose). The present invention has no such limitation.

Finally, traditional robots cannot autonomously perform work within a pipe because they cannot correctly adjust the cutting path in the same manner a manual operator would make adjustments in response to visual cues. Because current cutting robots do not even attempt to adjust to changing conditions, such as different lining materials or dulled cutting bits encountered from cut-to-cut, they must rely on a manual operator for proper cutting. The impedance control methods of the present invention allow robots to automatically adjust to changing conditions in different situations by measuring impedance characteristics for each unique circumstance.

A wide variety of traditional methods for removing sediment or sealing pipe joints (or other manual processes) can be partially or fully automated with the impedance methods of the present invention. These and other new robotic devices and methods are continually sought to address these and other limitations of the prior art. Specifically, robotic devices that can monitor impedances and autonomously detect aspects important for pipe maintenance based on changes in these impedances in various circumstances without the need for extensive (or any) operator interaction are greatly desired. The present invention, in its many preferred embodiments, addresses these and other limitations of the prior art.

SUMMARY OF THE INVENTION

In its many disclosed preferred embodiments, the present invention provides autonomous robots, and methods for using these robots, that use impedance control to perform various types of work within a pipe or a network of pipes (note: for purposes of this application, the word "pipe" includes any hollow or semi-enclosed void into which a robot may be inserted). These devices sense and determine various characteristics of their environment (e.g., sharpness/dullness of work tool on the robot, thickness of the pipe liner upon which work is being performed, type of material of which the pipe/liner is made, etc.) at the time and location that the work is to be performed. An impedance-based software control algorithm is then utilized to perform the work (which may include cutting open or reinstating a lateral after a relining process, removing debris from a pipe, sealing pipe joints, etc.) with the proper amount of force based on the sensed impendence characteristics.

One exemplary embodiment according to the present invention provides methods for automatically cutting along the edge of a lateral/main pipe interface using cutting tools contained in autonomous robotic devices after the main line has been relined. The robot is controlled by software that allows the cutting tool to automatically trace the edge of the pipe by adjusting the cutting vector based on monitored changes in impedances on the cutting tool.

Figure 4:
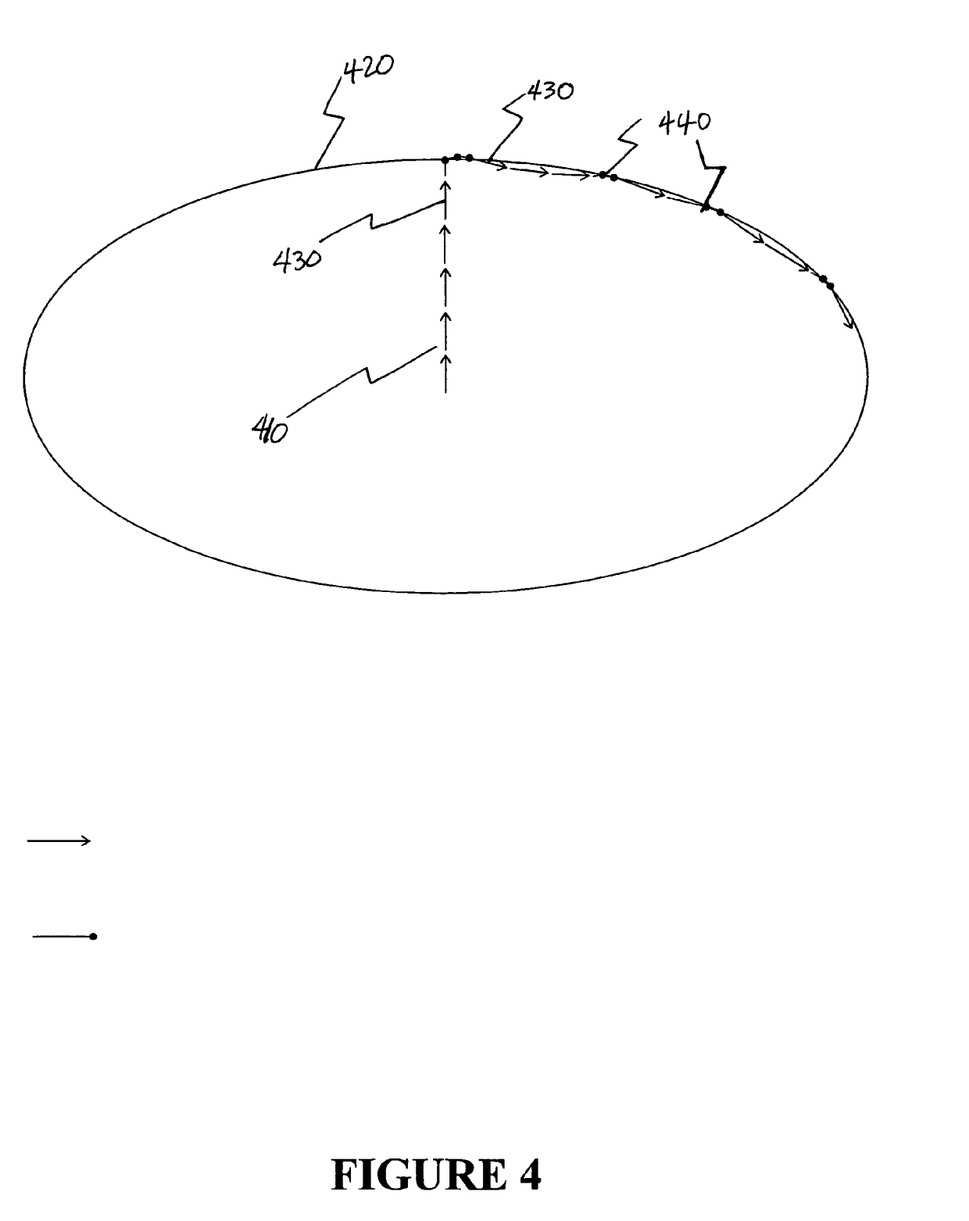
FIG. 4 illustrates changes in a cutting vector during automated reinstatement of a lateral pipe connection.

Generally speaking, a "baseline" impedance is determined by the robot cutting the liner over a small test surface (e.g., in the middle of the lateral/main interconnection). The encountered impedance (which necessarily takes many environmental characteristics, such as the dullness of the cutting bit and the thickness/material of the liner into account) is then used to set a threshold upper impedance value that the robot recognizes as an indication that the cutting tool has encountered the edge of the pipe, which is more difficult to cut through than the liner. When the edge is detected (because the impedance encountered rises appreciably), the software adjusts the cutting vector in one of several ways to continue cutting open the lateral. When the edge is encountered again, the cutting vector is adjusted again, and this process is repeated until the tool has completely traced around the pipe edge. Examples of these cutting processes are generally illustrated in FIGS. 4 and 5.

In order to cut open the lateral, the robot includes one or more bits or other work tools that perform the function of opening the lateral. There are a variety of different cutting tools that may be utilized within the scope of the present invention, such as the examples shown in FIGS. 6 and 7. In each of these embodiments, the tools include three distinct sections: (1) a plunging surface; (2) a bearing surface; and (3) a main cutting surface. Generally, the plunging surface is located at the tip of the tool and is capable of plunging through the pipe lining material. This can be a cutting tip (FIG. 6) or may be friction-based (FIG. 7). Proximal to the plunging surface is a non-cutting bearing surface which prevents the tool from cutting into the lateral and main pipes themselves. Proximal to this bearing surface is a main cutting surface which actually performs the cutting of the pipe lining material. By combining the plunging surface and cutting surface in one tool, these tools increase efficiency by eliminating the need to remove robots from pipes following plunging to exchange a plunging tool for a different cutting tool.

As described generally above, uses of this automated impedance-based control method include reinstatement of lateral pipe connections after pipe rehabilitation, cleaning pipe debris, sealing pipe joints, cutting through obstructions, de-calcification of pipes or a wide variety of other pipeline rehabilitation or cleaning processes. These automated methods provide improved speed, quality, and consistency over current methods that heavily rely on manual operation of cutting tools. Moreover, they can be used in some instances in which prior methods are impossible—such as using a visual camera link when the pipe is filled with an opaque liquid like thick waste. These and other features are described in more detail below.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

With regard to pipes and pipe networks, many maintenance tasks, generally including inspection, cleaning and relining/rehabilitation, are accomplished by deploying robots into the pipes. However, traditional methods in this regard rely on manual operation and control of the robots to detect pipe locations, pipe edges, sediment and thickness of sediment, thickness of obstructions, cutting force necessary to cut through obstructions, or other aspects important for these pipe maintenance procedures. These operator-intensive methods are characterized by slow execution times and a low quality level. For example, "burs" or other unclean edges may be left around the edges of the cut pipe.

The present invention provides impedance-controlled robots and methods that automatically detect these various aspects by using sensors to measure impedances (e.g., mechanical force impedance, velocity of movement of tools, back pressure impedance, etc.) and by monitoring changes in these impedances using an onboard controller and/or computer. An impedance-based software control algorithm is then utilized to perform the work (which may include cutting open or reinstating a lateral after a relining process, removing debris from a pipe, sealing pipe joints, etc.) with the proper amount of force based on the sensed impendence characteristics. These methods reduce the need for manual operator interaction and improve speed, quality, and consistency of pipe maintenance tasks.

Figure 1:
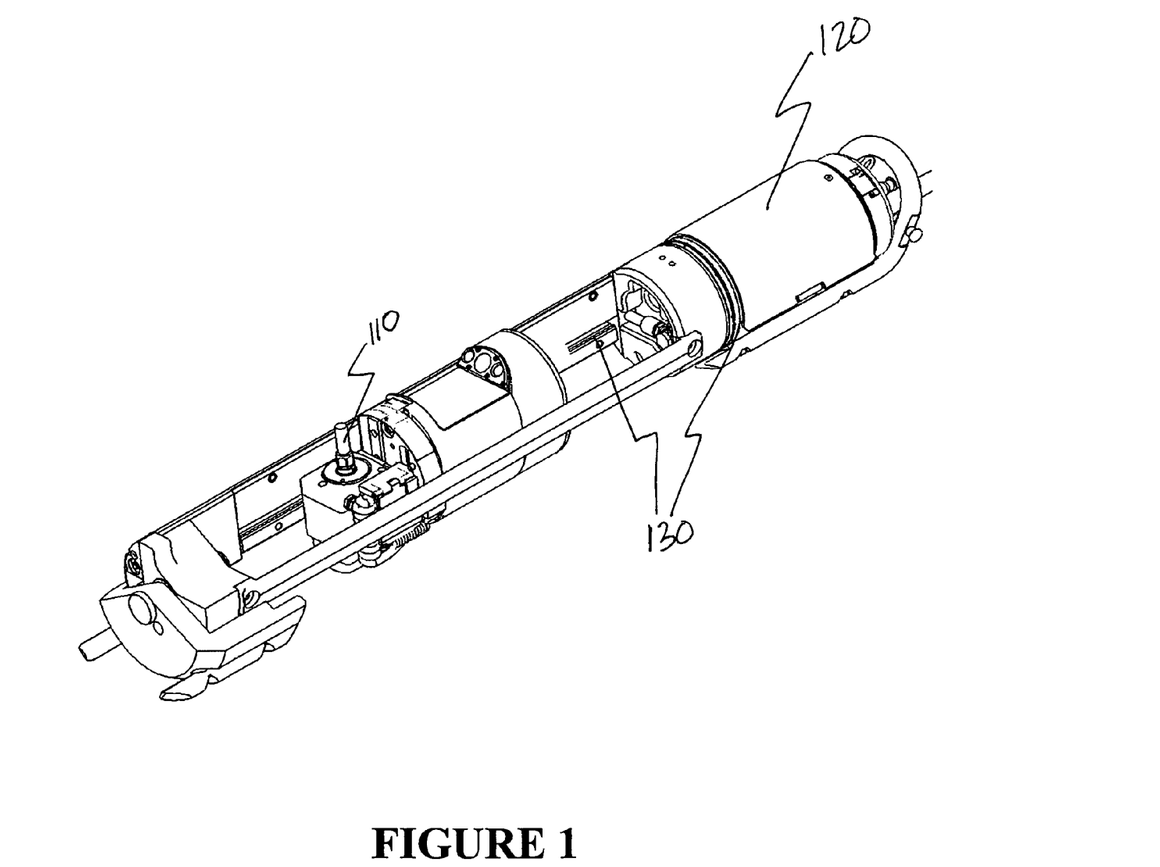
FIG. 1 shows a robot with an impedance-controlled cutting tool.

One important use of impedance control robots and methods is for reinstating a lateral pipe connection following pipe rehabilitation. During relining/rehabilitation, main/lateral pipe intersections become covered with the new pipe liner so that water/waste cannot pass through. Therefore, each of these laterals must be re-opened or reinstated to allow the flow of water/waste to proceed. The present invention, in at least one preferred embodiment, provides a robotic device, such as the exemplary device depicted in FIG. 1, to cut open these re-lined laterals. This robot generally comprises a tool 110 that can trace the edge of a pipe by monitoring impedances experienced by the tool. The robot preferably has a drive-train 130 for moving the tool with low gain to ensure good feedback of impedance data. Such an orientation enables high resolution in impedance sensing with a high torque (direct drive) motor.

In at least one preferred embodiment, the robot contains a cutting tool that can automatically cut along the edge of a pipe opening for reinstating lateral pipe connections following pipe rehabilitation. The robot contains sensors for providing feedback regarding the position of the tool and impedances experienced by the tool. Using this feedback, a computer controlling the tool utilizes software to determine tool action based on impedance. Generally, the edge of the pipe is detected and traced by monitoring impedances on the cutting tool and adjusting the cutting vector based on detected changes in these impedances.

Figure 8:
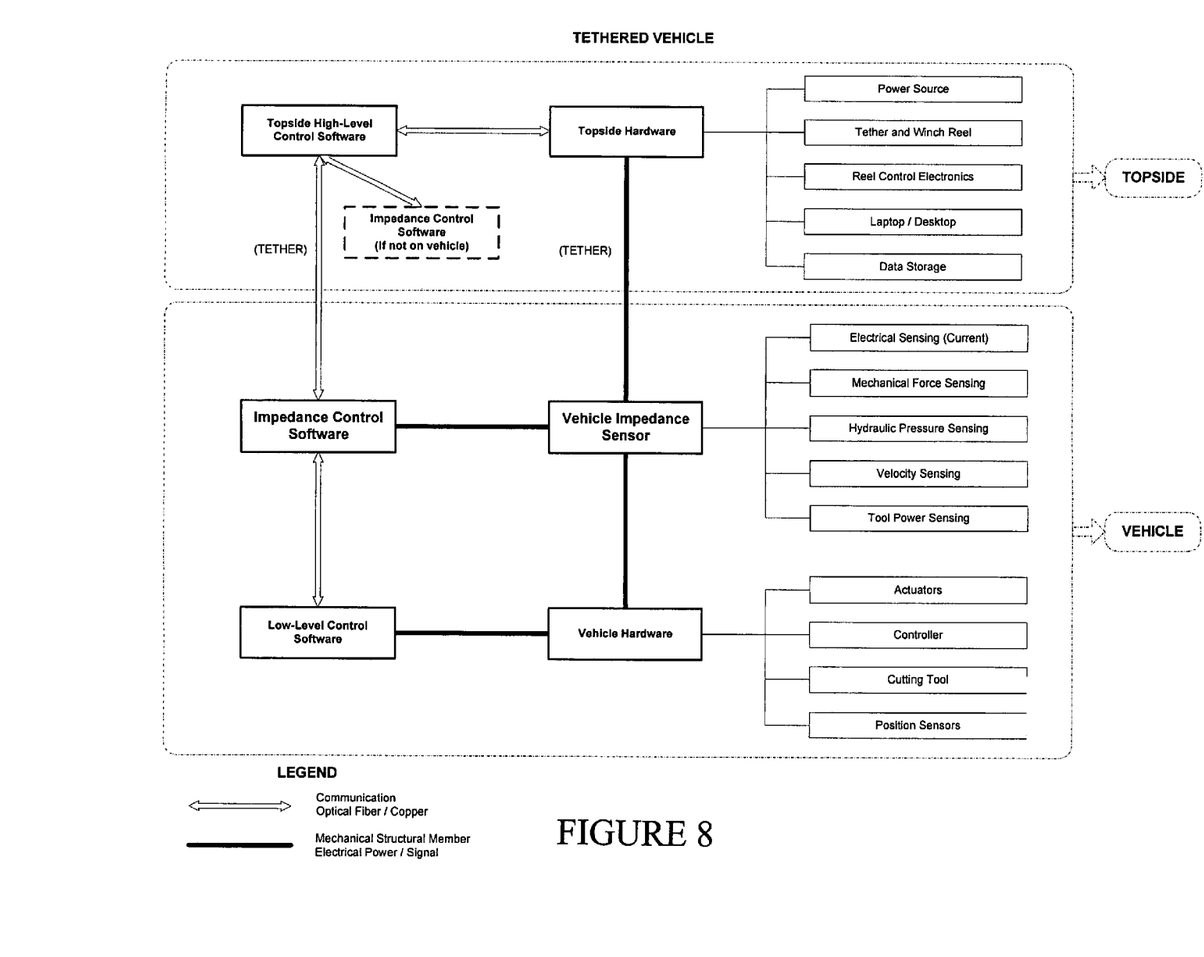
FIG. 8 shows a block diagram of an exemplary robot and system utilizing an impedance-controlled work tool.
Figure 9:
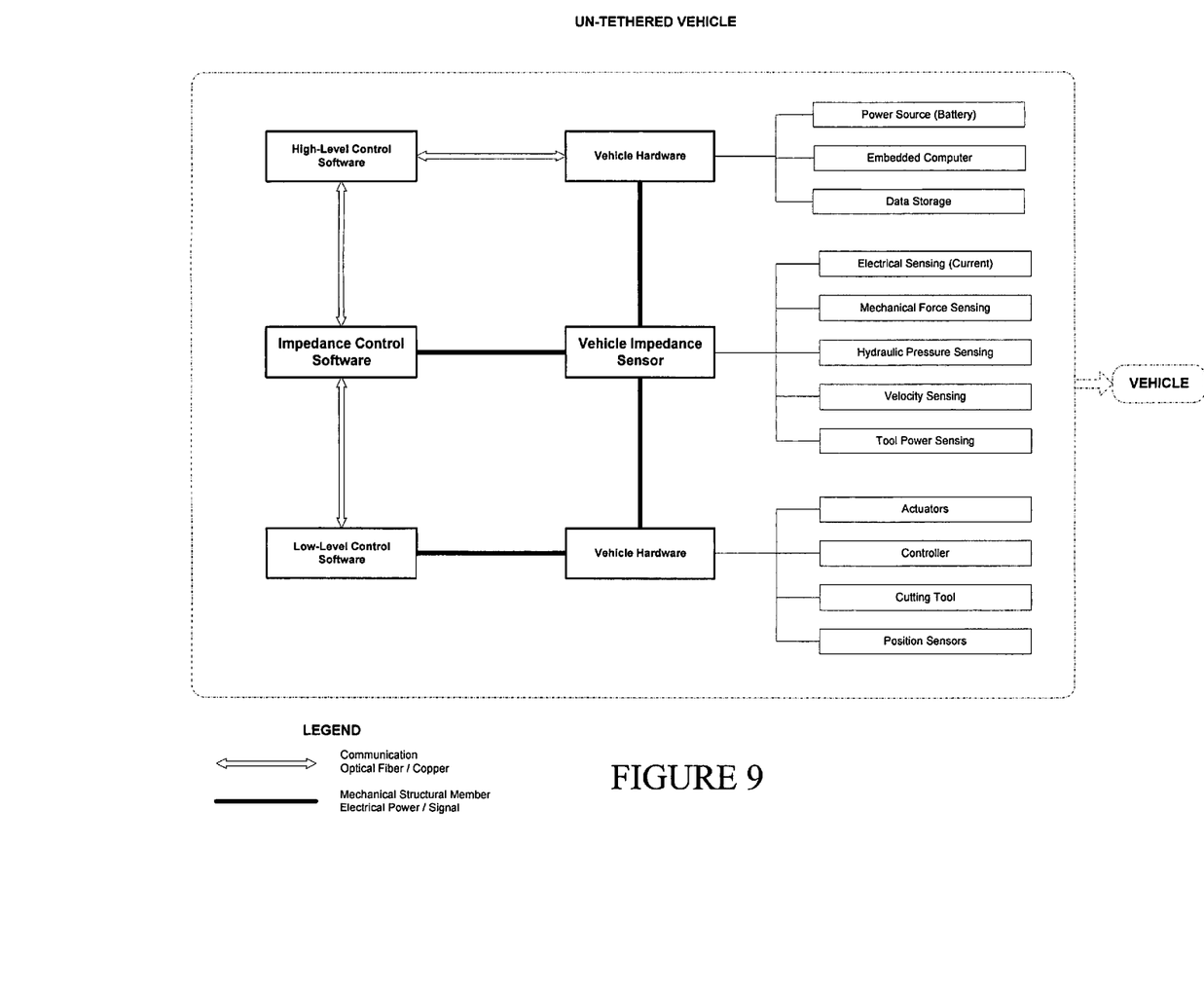
FIG. 9 shows a block diagram of an exemplary robot and system utilizing an impedance-controlled work tool in an un-tethered robot.

In more detail FIG. 8 shows a block diagram for the major robot and system components for carrying out the present invention using a robot within the main pipe that is tethered to hardware at the surface. FIG. 9 shows a similar block diagram for the major components of the robot and the system according to the present invention for an autonomous robot that is not tethered to the surface. The components needed to carry out impedance based control of a work tool are similar in both cases, but the various computer and control devices may be dispersed different as the tethered embodiment can split the control functions between onboard and topside (surface) control.

The tethered vehicle of FIG. 8 has both hardware and software split between the subterranean robot and topside. A representative but not comprehensive list of topside hardware includes a power source, tether reel, winch reel, reel control electronics, computers, data storage, payout sensing, tether load sensing etc., as known in the art. The high level software on the topside controls the operation of the reel and the vehicle through a graphical user interface. The tether from the main reel connects to the robot and typically supports mechanical strength, electrical power and communication from the topside to the robot. The robot navigates in the pipe either by self-locomotion or by being pulled from a far side access shaft or manhole with a winch reel.

Once the vehicle is in proximity of the work area, it may be anchored in the pipe by some means of mechanical clamping. The robot then proceeds to perform the desired work, upon operator direction or automatically based on high-level software command. The work may be cutting a lateral, cleaning a pipe, rehabilitation etc. To do the desired work the robot utilizes a low level software that controls all the actuators including the work tool and an impedance control software that uses feedback from the impedance sensor to control the actuators and the work tool through the low level software. The impedance control software may either be part of the vehicle or the topside high-level software.

The impedance sensor can be any one or more of, but not limited to, electrical sensing, mechanical force sensing, hydraulic pressure sensing, velocity sensing, tool power sensing etc. The impedance sensor provides real-time feedback on some aspect of the work being performed and helps the software determine appropriate actions based on the feedback to complete the operation either fully automated or with optional real-time operator intervention as the work is being performed. All data collected from the impedance sensor and other sensors on the robot during completion of the work are continuously recorded for later use in reporting, analysis and/or process improvement.

The un-tethered robot of FIG. 9 has the same functionalities as the dual-vehicle system of FIG. 8, but all hardware, including computing, and software is onboard the robotic vehicle. Because this robot acts autonomously when on a mission to perform some type of work, the onboard high level software includes mission planning and navigational control in addition to the high-level control software on a tethered vehicle. It also has on-board data storage and power source. The impedance and low-level software, and robot hardware are analogous to the tethered vehicle implementation (FIG. 8).

To utilize an impedance-controlled robot to reinstate a lateral connection after a relining process, a robot is first deployed within the main pipe in proximity to the blocked lateral connection. The blocked lateral connection is located either automatically using previously input data regarding the location of service connections or some other sensing mechanism, or it may be located manually using a reel payout sensor and onboard video cameras. Previously input data for use in the automatic process may include information from pre-inspection reports that give the distance and clocking position of each lateral, and thickness of the installed liner.

After robot deployment, the location of the blocked lateral connection can be confirmed by recognizing a dimple by either visual inspection or automatic scanning to detect changes in the depth of the pipe lining material. The robot's cutting tool is then aimed approximately over the center of the blocked connection, and its position is manually confirmed either visually or by using a dimple map generated using scanning data. If not centered, the cutting tool may be manually or automatically centered over the blocked connection by an operator or using known software techniques. The robot is then clamped in place within the main using, for example, air bag clamps, small extending anchors or another device that shores the robot to the walls of the main. Locking the robot in place during cutting ensures an accurate cut by preventing shifting of the robot due to cutting torque or other forces.

After anchoring the robot to the main (or other stationary locations), the cutting tool plunges, or penetrates, through the lining material blocking the lateral connection. As briefly described above, the cutting tool preferably includes a plunging tool at its tip, a main cutting surface perpendicular to the plunging tool and a bearing surface located between the cutters. In one embodiment, a cutting tool (such as that depicted in FIG. 6) penetrates the lining by cutting through the lining using a plunge cutting surface 600. In another embodiment, a cutting tool (such as that depicted in FIG. 7) penetrates the lining using frictional heat generated by contact of a plunge frictional surface 700 (which is spinning at a high rate of speed) with the lining material.

Cutting of the lining material then proceeds as illustrated in FIG. 4, which depicts a cross section of a pipe with arrows indicating the direction of cutting. Dots 440 indicate locations where the cutting tool encounters the lateral edge. After plunging, the cutting tool automatically cuts in a predetermined direction 410 toward the edge of the lateral connection opening (in the present description, the "edge" of the lateral constitutes the inner circumference of the hollow lateral pipe at the intersection between the lateral and the main). While cutting, impedance data regarding the cutting tool is monitored via sensor feedback and sent to a controller. Sensors may include electrical sensors, mechanical force sensors, hydraulic pressure sensors, velocity sensors, tool power sensors, etc. Monitored data may include electrical impedance (current), mechanical force impedance, the velocity of cutting bit rotation, velocity of cutting bit travel toward the lateral edge, vector of the cutting bit travel toward the lateral edge, current output used to spin the cutting bit, current output to drive the cutting bit toward the lateral edge, and position of the cutting bit. Changes in this data will indicate contact of the cutting tool with the lateral edge 420.

As shown in FIG. 4, once the cutting tool encounters the lateral edge, the cutting vector 430 is automatically adjusted to trace the lateral edge. The robot preferably detects the lateral edge via a controller that monitors changes in impedance data collected by sensors. For example, mechanical force impedance may increase because it is more difficult to cut through a lateral pipe than the plastic liner, and velocity of cutting bit rotation and velocity of cutting bit travel toward the lateral edge may decrease when the cutting tool encounters the edge (for the same reason). Further, the vector of the cutting tool may change.

At least one embodiment of the present invention provides for automatic calibration of the cutting tool to determine the proper force needed to cut the pipe lining material and to distinguish the liner from the edge of the lateral. Determining the proper cutting force to use with the automated impedance cutting method described above is important for several reasons. First, selecting a cutting force that is too high may result in damage to the lateral pipe each time the cutting tool encounters the lateral edge. Likewise, choosing a cutting force that is too low may result in the detection of false edges. However, determining the proper threshold force is not trivial as the proper force can be affected by variables such as percent curing of cured-in-place liners, slugs, sharpness of the cutting tool, liner thickness, and liner type.

In general, calibration for a particular tool, liner material, and lateral combination ensures accurate detection and tracing of the lateral edge. Calibration can be achieved by plunging the cutting tool through the liner (at a location of the liner within the "dimple" or within the interconnection between the lateral and the main pipe), cutting for a predetermined time in a predetermined direction using known force, then cutting for a predetermined time in a different direction using a know force. By measuring the distance traveled by the cutting tool, a "cutting resistance" (or impedance) can be calculated for that particular combination of cutting tool, liner material, and lateral connection. This "baseline impedance" can then be used to quantify a "threshold impedance" that the robot identifies as the lateral edge, and hence alters its cutting vector. Re-calibrating the robot by sensing a baseline impedance and calculating a threshold impedance before cutting each lateral open maximizes the efficiency of the system. Proper calibration also permits the impedance control method to adapt to varying situations (e.g., dulling of the cutting surface over time).

Once the edge is detected, the cutting vector (direction and speed) of the cutting tool can be adjusted, for example, by choosing a vector slightly less than parallel to the contacted edge vector, which can be approximated by, for example, detected changes in the cutting vector upon encountering the edge. For example, when cutting in the direction of an intended cutting vector, the actual cutting vector may veer off-course (i.e., be deflected) when the cutting tool encounters an edge. The change in the cutting vector can be used to approximate the vector of the encountered edge.

Alternatively, the new cutting vector can be adjusted after backing the cutting tool slightly away from the contacted edge. This slight backing away may be necessary if the cutting tool stalls because it is too close to the lateral edge.

Following the cutting vector adjustment, cutting continues along the new vector until the edge is encountered again. This contact with the edge is determined by the controller's interpretation of the sensed impedance—in the same way as described above. The cutting tool vector can then be adjusted to slightly greater than or less than the vector used to contact the edge to trace the lateral edge. Again, the cutting tool can optionally be backed away from the edge to prevent stalling. Once the edge is encountered again, the cutting vector is similarly readjusted. This process of readjusting the cutting vector is repeated until the lateral connection has been reinstated.

After cutting, depending on the process used, an additional "brushing" process may be used to clean any burrs or other rough edges from the sides of the lateral. For example, because the cutting is computer-controlled, a map of the edge or rim of the lateral is created and stored during the cutting process. This same cutting path, or a slightly expanded path, could be followed a second time using the main cutting surface of the work tool, or a separate brush attachment to the same or a different tool to trace the previous cut. This additional step may be used to clean and smooth the cut to reduce burrs/edges that may later trap debris and clog the pipe.

After the cutting is completed, the clamps locking the robot in place can be released, and the robot can be moved to another blocked lateral connection and repeat the process for automated reinstatement. In preferred embodiments, the calibration step is carried out at the new location to take into account any differences encountered in the second or subsequent lateral.

Figure 6:
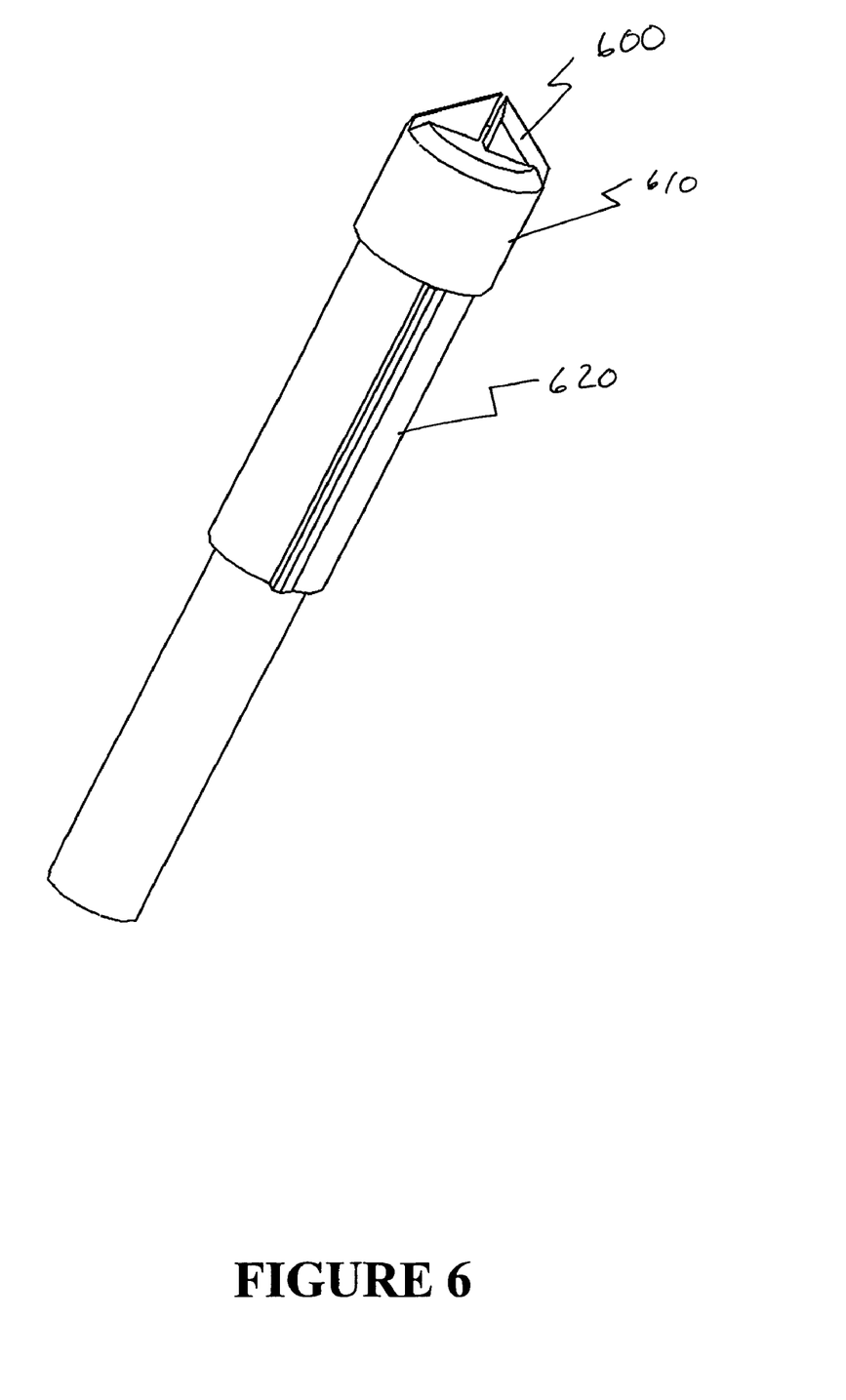
FIG. 6 shows an impedance-controlled cutting tool with a plunge cutting surface.
Figure 7:
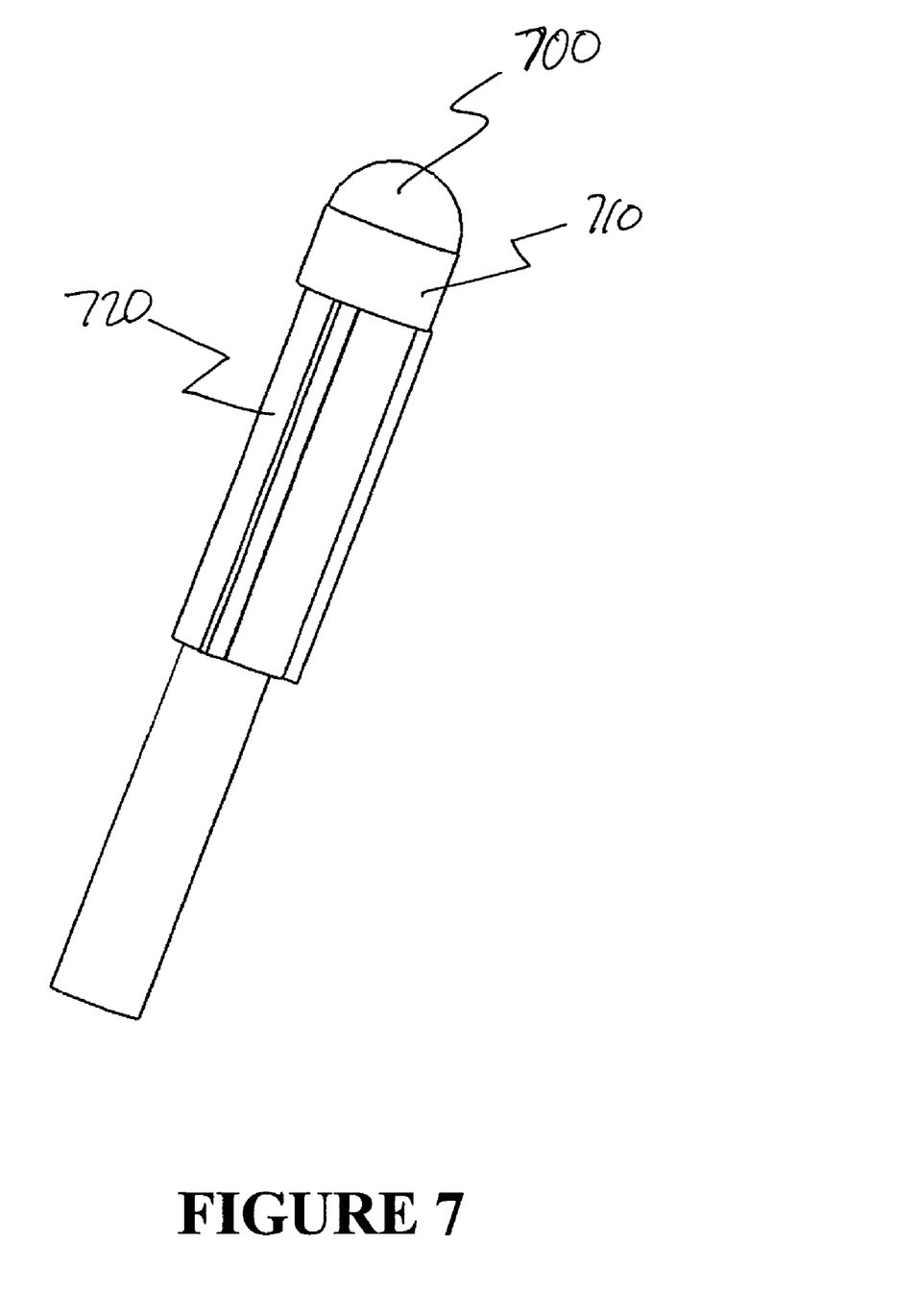
FIG. 7 shows an impedance-controlled cutting tool with a plunge frictional surface.

FIG. 6 shows one embodiment of a cutting tool according to the present invention. Generally, the tool includes a plunging surface at the tip capable of plunging through pipe lining material. Proximal to the plunging surface is a non-cutting bearing surface. Proximal to the bearing surface is a main cutting surface capable of cutting pipe lining material. In the FIG. 6 embodiment, the plunging surface plunges through pipe lining material by cutting the material with a plunge cutting surface 600. This embodiment further includes the non-cutting bearing surface 610, and main cutting surface 620. These cutting surfaces rotate at a speed appropriate to the type and thickness of the liner.

FIG. 7 shows another embodiment of a cutting tool. In this embodiment, the plunging surface plunges through pipe lining material using heat friction generated by contact of the rapidly-spinning tool 700 against the pipe lining material. This embodiment further includes the non-cutting bearing surface 710, and main cutting surface 720.

Figure 5A:
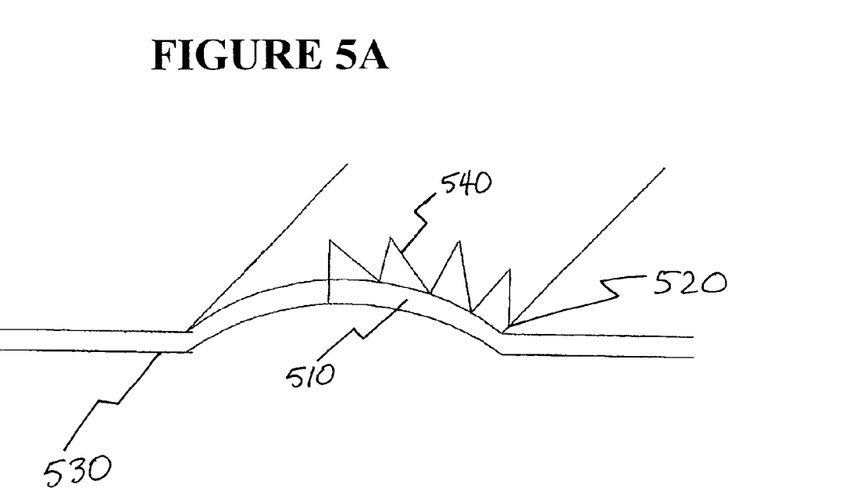
FIG. 5 illustrates a method for automatically measuring the cutting depth for automated reinstatement of a lateral pipe connection, including an edge view (FIG. 5A) and a face view (FIG. 5B)
Figure 5B:
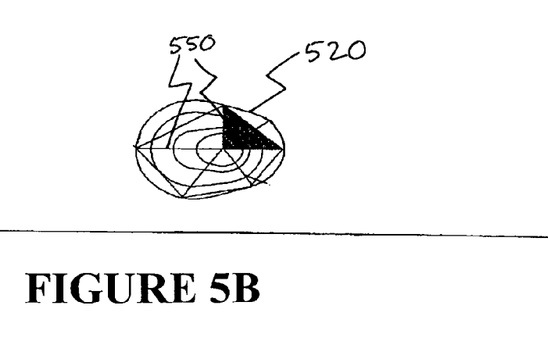

The robot of the present invention can also be used with an automated method for determining the depth to reinstate laterals for a rehabilitated pipe. FIG. 5A depicts an edge view of this method, and FIG. 5B depicts a frontal or face view of this method. FIG. 5A indicates the path 540 of the cutting tool. This measurement determines the depth required of the cutting tool to cut through the lining material 510 blocking a lateral connection. First, a cutting tool containing a non-side cutting bearing surface at the tip is plunged through the lining material approximately at the center of the lateral connection. The tool is plunged to its maximum reach or until sensor feedback indicates the tip of the tool has reached a solid surface. Next, the tool cuts toward the lateral edge 520 while the tool is retracted in a direction perpendicular to the inner face 530 of the relined pipe. When the bearing surface reaches the lining material, the tool will be unable to cut and will stall. At this point, the depth of the bit indicates the distance to the outer surface of the new lining. The tool is then plunged to the maximum depth again, and the cut and retract process is repeated until the lateral edge is reached. This process is then repeated at different angles 550 to determine the depth at various portions of the dimple.

In one or more of the embodiments described above, the present invention also provides for couponing, or cutting out the liner blocking a service connection in more than one piece. Couponing prevents cut-out liner material from getting stuck in the lateral opening, which may occur if the material is cut out in a single piece. Because the present cutting methods utilize computer control, such a couponing methodology may be applied to the present invention using conventional software techniques.

In one process for couponing, the cutting tool position is recorded at the time of plunging through the lining material. The tool then cuts to the lateral edge, and cuts along the edge by automatic adjustments to the cutting vector as previously described. Once the cutting vector changes by a predetermined amount (e.g., one eighth of the circle), the cutting tool cuts back to the original plunge point, creating a coupon that falls out of the blocked lateral connection. This process is repeated until the entire lateral connection has been reinstated.

Especially with couponing, the robot may automatically perform a second cut to clean the edges of the lateral connection after the lateral has been reinstated. The path of this cut is preferably determined by calculating a slight offset to the original cutting path. This cleaning cut reduces the need for wire brush clean up, which is normally performed following current methods of lateral reinstatement.

If the robot is used to cut open a series of laterals in succession down a main pipe, cutting shards or other debris may clog the gears and moving parts of the robot. Therefore, the present methods may also include a step wherein each drive axis of the robot (for each moving part) is exercised in between cutting tasks in order to dislodge debris, which may accumulate in the drive axes and prevent motion.

Finally, the impedance control methods of the present invention may also be used to gather data to generate about the shape of a dimple (at a lateral/main intersection) without plunging through the dimple. This information can then be used to generate a map of the z-axis (into and out of the dimple) that can be used with the x,y coordinates of the tool position along the dimple for more accurate control.

For example, one methodology gathers dimple mapping data by a determination of dimple depth by "Touch Scan." This process builds a coarse or fine map of the dimple depth with respect to x,y position in the pipe. Based on this map, the tool depth is adjusted accordingly as it cuts through the dimple. The process for creating the dimple depth map using a touch scan is similar to impedance cutting in that the software chooses several x,y coordinates within the dimple and plunges the tool until it contacts the inner surface of the dimple (on the main side). After repeating this process for a plurality of locations across the face of the dimple, the software within the robot controller then interpolates between these "touch" points and builds a coarse map of the dimple.

A similar process can be used to create such a map without actually contacting the surface of the dimple. In this embodiment, a much more accurate dimple map can be built using different sensors, one of which is structured light. This light or wave based sensors are characterized by high resolution and low power consumption.

Non-Lateral Cutting Embodiments

Automated impedance controlled methods can also be used for tasks other than reinstating lateral connections following pipe rehabilitation. For example, automated impedance control methods can be used to cut through other obstructions, to clean sediment, and/or to seal pipe joints. Generally speaking, the only change involved is to attach a different work tool to the robot and to alter or change out the software algorithm.

Figure 2:
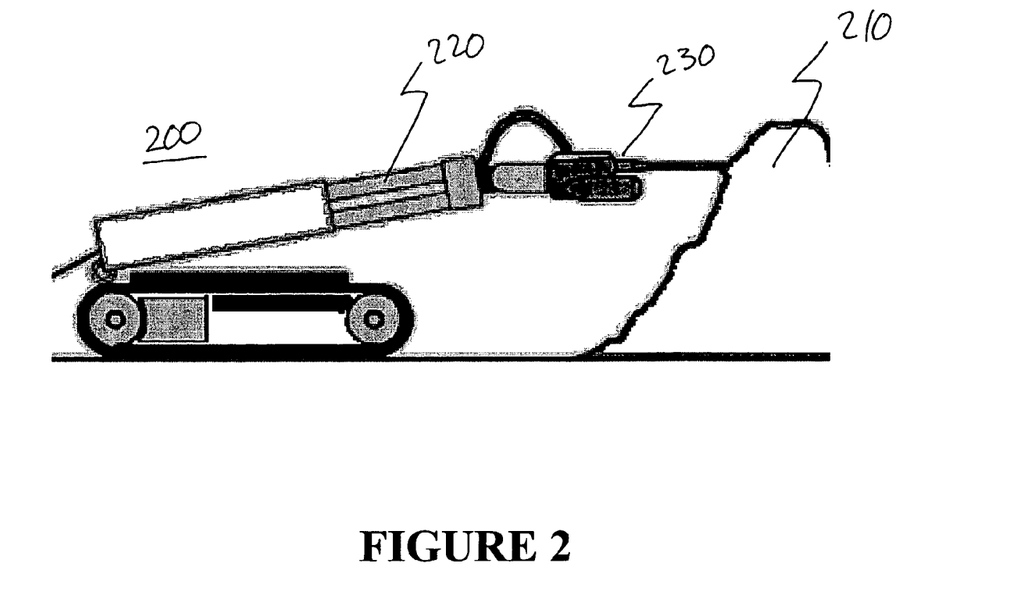
FIG. 2 shows a robot with an impedance-controlled high pressure water jet tool.

In at least one embodiment, illustrated in FIG. 2, impedance control can be used to clean sediment 210 in a fully submerged pipe. In this embodiment, a robot 200 contains an "arm" work tool 220 with a high pressure water jet 230 that is used to remove sediment. Since the sediment or obstruction profile is unknown, is continuously variable and sometimes cannot be visually detected, impedance-based control is used to continuously sense the reaction forces on the arm from the water jet. For example, changes in back pressure impedance (water jetting) or hydraulic pressure impedance can be monitored. Based on changes in reaction forces on the arm, the water jet's position is continuously adjusted to remain close to the sediment. This continuous readjustment allows the robot to efficiently clean the sediment as it re-suspends into the flow.

Figure 3:
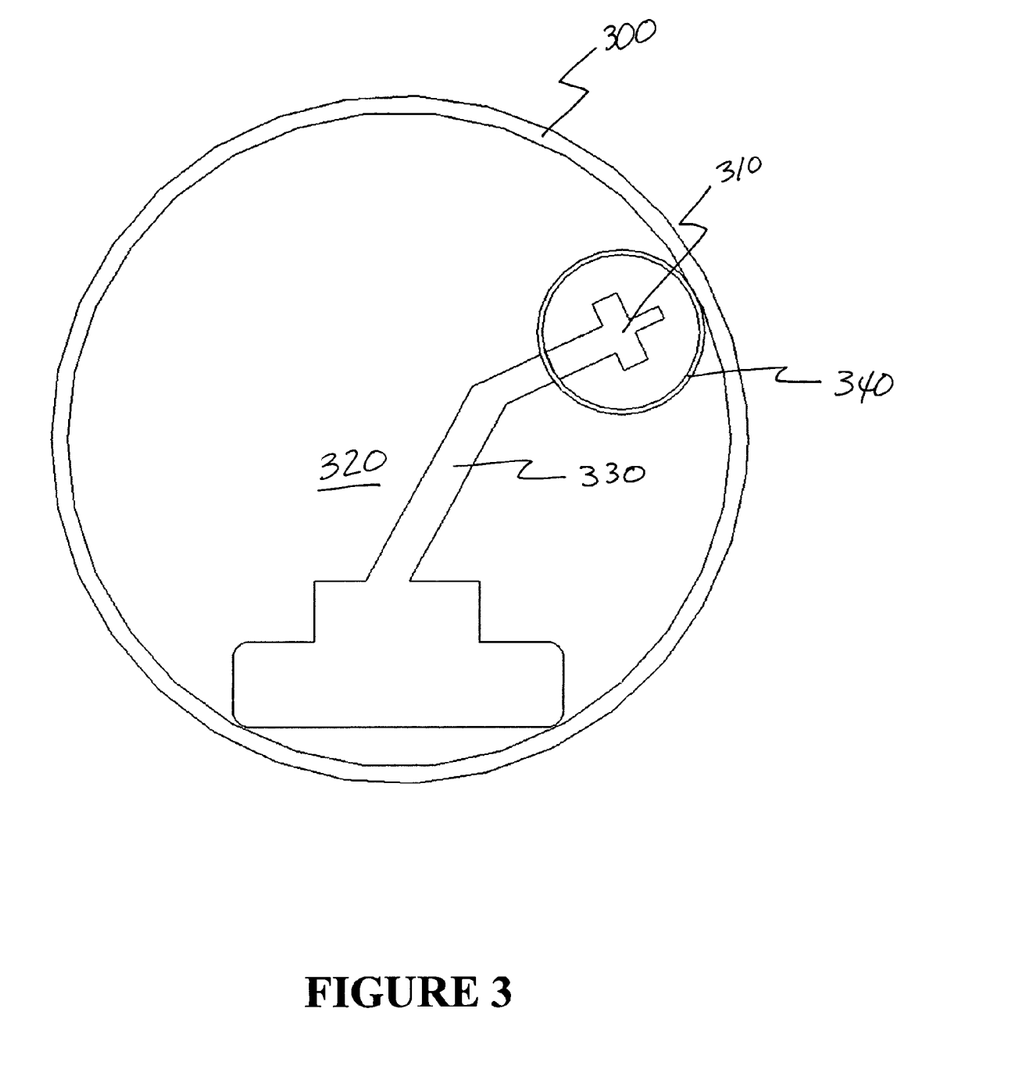
FIG. 3 shows a robot with an impedance-controlled tool for maintaining constant distance from a pipe surface during spraying of pipe sealant.

In another robot according to the present invention, FIG. 3 depicts a cross-section of a sealant-spraying robot inside a pipe. In this robot, impedance control is used to automatically seal pipe joints. When a pipe 300 is sealed by spraying sealant, the spray head 310 dispensing the sealant should be at a constant distance from the pipe surface. This embodiment provides a sealant-spraying robot 320 containing an arm 330 with a spray head at the end of the arm. A circular ring 340 encircles the spray head of the sealant-spraying robot. The arm is moved around the pipe using impedance control to maintain constant contact between the circular ring and the pipe surface. Thus, the spray head remains a constant distance from the pipe surface, and automated sealing can be achieved without the need for a known robot pose, pipe shape, or visual feedback.

In yet another embodiment of the present invention, a thermal coring tool can be used with impedance control to drive holes through the surfaces of various pipes. In this methodology, the work tool includes a conical-shaped bit that is used to bore a hole, and sensors mounted to the bit gather impedance-related data in various direction perpendicular to the bore. Based on the differences in the sensor detections on different sides of the conical bit, a computer algorithm can determine whether or not the bit is perpendicular to the surface of the pipe (and can likewise correct its orientation). Again, impedance control simplifies and automates a previously manually-intensive process when working within pipes.

Through the above examples, various impedance-controlled robots have been described for performing work within a pipe or pipe network. Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method, implemented at least in part with a computing device of a robot, for automatically removing a lining material covering an opening defined by a lateral pipe connected to a main pipe, the method comprising:
   at the robot, generating a three-dimensional map of a surface of the lining material while the robot is at a first position within the main pipe;
   plunging a cutting tool connected to said robot through said lining material, wherein the plunging is performed while the robot is at the first position;
   cutting said lining material toward an edge of said lateral pipe while monitoring impedance information related to said cutting tool, wherein the cutting is performed while the robot is at the first position;
   adjusting a depth of said cutting tool into an interior of said lateral pipe a plurality of times while cutting said lining material, wherein said adjusting is based on the three-dimensional map of the lining material;
   determining when said cutting tool has encountered the edge of said lateral pipe based on a change in said impedance information as determined by a processor of the computing device of the robot; and
   adjusting a cutting vector of said cutting tool to approximate a shape of said edge, wherein said adjusting of the cutting vector is based on said change determined by said processor.

2. The method of claim 1, further comprising the steps of:
   after said plunging step, cutting a test portion of said lining material to determine a baseline impedance level; and
   determining a threshold impedance level above said baseline impedance level to represent an impedance of the edge of said lateral.

3. The method of claim 1, further comprising:
   repeating said steps of cutting said lining toward said edge, determining when said cutting tool encounters said edge, and adjusting the cutting vector of said cutting tool.

4. The method of claim 1, wherein said impedance information is selected from the group consisting of electrical impedance, mechanical force impedance, back pressure impedance, hydraulic pressure impedance, cutting tool velocity, current output and cutting head velocity.

5. The method of claim 2, wherein said step of cutting a test portion comprises cutting said lining material in a straight line for a predetermined amount of time and measuring a distance traveled during the cut.

6. The method of claim 2, wherein said threshold impedance is set at a predetermined percentage above said baseline impedance.

7. The method of claim 1, wherein said step of adjusting a cutting vector of said cutting tool is characterized by changing the cutting vector to be perpendicular to the edge of said lateral pipe.

8. The method of claim 1, wherein said step of adjusting a cutting vector of said cutting tool is characterized by reversing a direction of said cutting tool away from the edge of said lateral pipe.

9. The method of claim 1, wherein the three-dimensional map of the lining material is generated before said plunging step.

10. The method of claim 9, wherein generating the three-dimensional map comprises using structured light to generate the map.

11. The method of claim 9, wherein generating the three-dimensional map comprises touching a surface of the lining material at a plurality of different points at the opening.

12. The method of claim 1, wherein said cutting comprises cutting said lining material covering said opening into a plurality of pieces.

13. The method of claim 1, further comprising adjusting a force applied by said cutting tool based on said change in said impedance information.

14. The method of claim 1, further comprising clamping the robot in place at the first position.

* * * * *